United States Patent Office 3,081,272
Patented Mar. 12, 1963

3,081,272
WAX, COPOLYMER ISOBUTYLENE-STYRENE, POLYETHYLENES COATING COMPOSITION
Arthur J. Reinsch, Middletown, N.J., assignor to Esso Research and Engineering Company, a corporation of Delaware
No Drawing. Filed Feb. 24, 1959, Ser. No. 794,825
6 Claims. (Cl. 260—28.5)

The present invention is concerned with an improved wax composition. More specifically, it deals with a dairy wax composition having a low tendency to blister as well as giving a smooth surface appearance when used as a paper or cardboard coating material.

The application of various waxes derived from petroleum oil, e.g. paraffin and microcrystalline wax, as coatings for food containers, wax paperboards and wraps, etc., is well known in the art. It has heretofore been suggested that the properties of waxes may be improved by incorporating various additives. For example, it has been previously suggested to incorporate vegetable acids, esters, amides, etc. into the wax composition, to improve some specific property of the wax.

Waxes, particularly those required for dairy uses, must give good control over bulge, resist leakage and provide good coverage over the surface coated to serve as a moisture barrier. The wax coated carton or paper must have a smooth coating as opposed to a serpentine or mottled appearance. Further it must exhibit good resistance to blister. The term blister is used to denote the tendency of a thin layer of wax to be pulled from the sides of the wax-coated material resulting in an unsightly haze. The degree of blistering, i.e., the percent of a total wax coated area which shows blistering, is normally measured by observing the percent blistering occurring on a waxed paperboard after exposure to an ice water mixture and then cold air. Both the latter properties are exceedingly important from the viewpoint of consumer acceptance.

The present invention is concerned with an improved wax composition having both particularly good blistering properties and giving a smooth coating. Heretofore, it was found that one of these properties had to be sacrificed in favor of meeting high quality requirements in the other. It has now been found that a specific combination of constituents simultaneously gives excellent blistering resistance and smooth appearance as well as having satisfactory other properties.

More specifically, a paraffin wax containing a minor portion of a copolymer of isobutylene and styrene, together with a relatively low and a relatively high molecular weight polyethylene has been found to give both excellent blistering resistance and carton appearance. The isobutylene-styrene copolymer preferably contains about 30 to 70 wt. percent styrene. The molecular weight of the polyethylenes ranges from 1500 to 3500 for the low molecular weight material and from 4000 to 14,000 for the high molecular weight polyethylene, both as measured by the Staudinger method. As will be demonstrated by data later presented, the present composition unexpectedly gives results far superior to (1) simply employing styrene-isobutylene copolymer in a wax, (2) simply employing styrene-isobutylene copolymer in a wax containing a single polyethylene; either of a relatively low or high molecular weight, as well as (3) giving considerably better results than the use of two polyethylene wax additives without employing a styrene-isobutylene copolymer.

It is to be clearly understood that the present invention is not predicated on the use of any combination but the total combination of constituents indicated above. For example, the mere addition of a polyisobutylene-styrene copolymer to a wax is indicated in U.S. 2,593,381 as improving light stability, tensile strength and moisture resistance. However, it is only by the combination of elements herein taught that excellent blistering and appearance properties are achieved.

It is to be understood that numerous additives may be used in conjunction with the paraffin wax composition of the present invention although the present composition above will suffice for most premium uses. By way of illustration, a minor portion of micro (microcrystalline) wax may be added in amounts up to about 18 wt. percent based on total blend as a means of further enhancing resistance to bulge. Small amounts of antioxidants such as 2-di-tertiary butyl, 4-methoxyphenol or 2,6-di-tertiary butyl paracresol may also be added.

The styrene-isobutylene copolymer employed in the present composition may be any of a number of commercially available polymers. In general, it will have a molecular weight within the range of 8,000 to 600,000 as determined by the Staudinger method. Typical suitable polymers, sold under the trade name of "Parapols," and their properties are indicated below.

Table 1

| Trade Name, Parapol | S-40 | S-40 | S-60 |
|---|---|---|---|
| Wt. percent Styrene | 40 | 50 | 60 |
| Spec. Gravity | | 0.96 | 0.93 |
| Heat Softening Point, ° C. | | 52 | 56 |
| Tensile Strength, p.s.i. | 1,100 | 1,900 | 2,500 |
| Intrinsic Viscosity [1] | | 1.2 | 1.0 |

[1] As determined by the standard Flory method.

Typical properties of several of both the relatively high and low molecular weight polyethylenes applicable for use in the present composition are indicated in Table 2. Molecular weights are determined by the Staudinger method.

Table 2

| Polyethylene | Average Molecular Wt. | Softening or Melting Point, ° C. | Viscosity, cps. | Specific Gravity |
|---|---|---|---|---|
| Type A | 2,000 | 85–90 | 230@140° C | 0.92 |
| Type B | 2,000 | 97–102 | 180@140° C | 0.92 |
| Type C | 2,500 | 106 | 2,200–2,700@121° C | 0.93 |
| Type D | 5,000 | 102–104 | 4,000@140° C | 0.92 |
| Type E | 5,000 | | 8,000@150° C | 0.91 |
| Type F | 12,000 | 104 | 50,000@190° C | 0.92 |

In general, the paraffin wax will comprise the major portion of the composition, i.e. at least 80 wt. percent.

It may be derived from numerous crudes and normally has a melting point of 115 to 140° F., preferably being a relatively narrow cut having a melting point of about 120 to 127° F. It should preferably have a maximum oil content of about 0.7 wt. percent. The styrene-isobutylene polymer preferably comprises no more than 2 wt. percent of the composition. The total concentration of the polyethylene should be no more than 5 wt. percent, preferably about 2 wt. percent (based on wt. percent of total composition). The weight ratio of the low molecular weight polyethylene to high molecular weight polyethylene preferably ranges from about 0.5 to 2.0 (based on the wt. percent of each in the total composition).

Thus a typical composition illustrative of the present invention would be (1) about 97 wt. percent paraffin wax having a melting point of 120–125° F.; (2) 1 wt. percent of the copolymer; and (3) about 2 wt. percent of a mixture of polyethylenes having a molecular weight of about 3000 and 9000, the low and high molecular weight polyethylenes comprising 1.25 and 0.75 wt. percent, respectively, of the total composition.

The various constituents of the composition may be incorporated in the paraffin wax by the following method:

(1) Make concentrates of approximately 20 wt. percent in the paraffin wax. The polyethylene concentrate is best made by gradually adding the polyethylene pellets or powder to paraffin wax at 210–230° F. and stirring until clear. The Parapol concentrate is made by gradually adding the Parapol pellets to paraffin wax at 210–230° F. and stirring until uniformly dispersed as shown by absence of pellets or lumps.

(2) The correct amount of each concentrate for the blend desired is then added to the proper amount of paraffin wax at 160–170° F. (with a little agitation to make a uniform mixture).

The composition of the present invention may be used for coating cartons, paperboard, etc. by application of any of the standard procedures such as dipping the paperboard in a bath of the present composition maintained at a temperature of 170° F. for 9 seconds.

The following experiments illustrate that the composition of the present invention is unique as compared to various other compositions in simultaneously giving excellent blistering and smooth coating appearance.

In all experiments, a 2 by 6 inch portion of a paperboard carton was dipped to a height of 4 inches for 9 seconds in a bath of the wax composition maintained at 170° F. In every case the paperboard to be coated was cut from quart Pure-Pak milk cartons from the same paper supplier and printed with the same design. The paperboard cartons used were made from cylinder board, the type paperboard that this particular supplier uses.

After coating, the paperboard was drained for approximately 8 seconds. The waxed paperboard was then placed in a cold box maintained at 40–45° F. for at least 5 minutes.

The coating appearance was determined by a close visual inspection of the waxed paperboard surface. The degree of blistering was determined by immersing the waxed portion of the paperboard in ice water having a high concentration of ice for 2 hours. Each sample of waxed paperboard is then put in a cold box maintained at 40–45° F. for 2 hours. The samples are then removed from the cold box and rated for percent blistering on the printed side of the paperboard. The unprinted side of the paperboard doesn't blister. Percent blistering was therefore the percentage of total printed area coated with wax which had blistered.

Table 3 sets forth the blistering and appearance properties of various blends tested by the above procedure. In all cases, a paraffin wax having a melting point of 120–127° F. and derived from a San Joaquin crude was utilized. It comprised all of the mixture except for the percentages of additives indicated. Properties of the various additives are those previously indicated in Tables 2 and 3.

Table 3

| Blend Composition | Percent Blister | Coating Appearance |
| --- | --- | --- |
| 1. Paraffin wax alone | 83.0 | Serpentine. |
| 2. Paraffin wax plus styreneisobutylene copolymer: | | |
| (a) 0.1 wt. percent Parapol S-50 | 1.2 | Do. |
| (b) 0.5 wt. percent Parapol S-50 | 0.62 | Do. |
| (c) 1.0 wt. percent Parapol S-50 | 0.0 | Do. |
| 3. Paraffin wax plus 0.1 wt. percent Parapol S-50 plus 1.0 wt. percent of 2,000 mol. wt. polyethylene (B of Table 2) | 6.5 | Smooth. |
| 4. Paraffin wax plus 0.05 wt. percent Parapol S-50 plus 0.5 wt percent of 2,000 mol. wt. polyethylene (B) and 0.5 wt. percent 12,000 mol. wt. polyethylene (F of Table 2) | 1.5 | Do. |
| 5. Same as (4) but containing 0.25 wt. percent Parapol S-50 | 0.46 | Do. |
| 6. Paraffin wax plus 0.05 wt. percent Parapol S-50 plus 1.0 wt. percent 12,000 mol. wt. polyethylene (F) | 4.5 | Do. |
| 7. Paraffin wax plus 0.5 wt. percent 2,000 mol. wt. polyethylene (B) and 0.5 wt. percent 12,000 mol. wt. polyethylene (F) | 9.4 | Do. |

Thus, the total polyethylene content should be about 1% to less than about 5% by weight.

Referring to Table 3, it is seen that the paraffin wax alone gives extremely high blistering and poor surface appearance. Merely adding a copolymer of styrene and isobutylene (compositions 2(a), (b), and (c)) does greatly improve blistering properties but not the coating appearance, i.e. it has a mottled, serpentine surface. The addition of simply a relatively low molecular weight polyethylene to a composition containing the styrene-isobutylene copolymer improves appearance but adversely effects blistering (increasing it 5-fold over composition 2(a)).

However, composition 4 illustrates that the combination of high and low molecular weight polyethylenes together with the styrene-isobutylene copolymer in the paraffin wax unexpectedly yields a coated product having both good appearance and excellent blistering qualities. It is further to be noted that the two polyethylenes actually tended to enhance blistering somewhat since approximately the same degree of blistering was obtained with only half the styrene-isobutylene copolymer of composition 2(a). Composition 5 illustrates that the use of 0.25 wt. percent styrene-isobutylene copolymer in the present composition gives particularly little tendency to blister.

That simply adding a high molecular weight polyethylene to a paraffin wax containing isobutylene-styrene copolymer did not give desired results is illustrated by composition 6. For the same copolymer content, composition 6 gave three times as much blister as compositon 4.

Composition 7 clearly shows that a paraffin wax simply containing two different polyethylenes fails to achieve the results of the present invention.

Summarily, Table 3 clearly indicates the unexpected results obtainable by the use of the present invention.

Additionally, compositions such as 4 and 5 have been tested in actual dairy plants (on various Pure-Pak milk carton machines) and have been found to also have commercially acceptable coverage, bulge control, flaking and consumption properties.

As further illustrations of the effectiveness of the present compositions, various styrene-isobutylene copolymers were employed in the same paraffin wax of Table 3, together with a mixture of high and low molecular weight polyethylenes. The tests were run in the same manner as previously described, paraffin wax comprising all of the compositions other than the percentages of additives indicated. The properties of the copolymers are those listed in Table 1.

Table 4

| Composition | Percent Blister | Coating Appearance |
|---|---|---|
| Paraffin wax + 0.1 wt. percent Parapol S-40 + Two Polyethylenes [1] | 0.31 | Smooth. |
| Paraffin wax + 0.5 wt. percent Parapol S-40 + Two Polyethylenes [1] | 0.05 | Do. |
| Paraffin wax + 1.0 wt. percent Parapol S-40 + Two Polyethylenes [1] | 0.0 | Do. |
| Paraffin wax + 2.0 wt. percent Parapol S-40 + Two Polyethylenes [1] | 0.0 | Serpentine. |
| Paraffin wax + 0.1 wt. percent Parapol S-60 + Two Polyethylenes [1] | 0.46 | Smooth. |
| Paraffin wax + 0.5 wt. percent Parapol S-60 + Two Polyethylenes [1] | 0.0 | Do. |
| Paraffin wax + 1.0 wt. percent Parapol S-60 + Two Polyethylenes [1] | 0.0 | Do. |
| Paraffin wax + 2.0 wt. percent Parapol S-60 + Two Polyethylenes [1] | 0.0 | Serpentine. |

[1] 0.5 wt. percent of 2,000 molecular weight polyethylene (B of Table 2) plus 0.5 wt. percent of 12,000 molecular weight polyethylene (F of Table 2).

The results depicted in Table 4 indicate that various styrene-isobutylene copolymers may be employed, e.g. styrene may comprise about 30 to 70 wt. percent of the copolymer. Further, it is seen that the copolymer should make up less than about 2 wt. percent of the composition in order to get both low blister and smooth surface appearance. In general, a concentration of 0.1 to 0.5% styrene-isobutylene copolymer is preferred.

In summary, a new composition of matter is herein taught which offers both good surface appearance and low blistering when employed to coat paperboards, cardboards, etc. That which is sought to be protected is succinctly set forth in the following claims.

What is claimed is:

1. An improved paraffin wax composition which comprises a paraffin wax, 0.1 to 2 wt. percent of an isobutylene-styrene copolymer, less than 5% of a mixture of a relatively low molecular weight polyethylene having a molecular weight of 1,500 to 3,500 and a relatively high molecular weight polyethylene having a molecular weight of 4,000 to 14,000, the weight ratio of the former to the latter ranging from 0.5 to 2.

2. A composition of matter comprising: (1) at least 80 wt. percent of a paraffin wax having a melting point of 115 to 140° F., (2) from about 1% to 2 wt. percent of a copolymer of isobutylene and styrene, said copolymer containing from about 30% to 70% of styrene, and (3) containing from about 1% to less than 5 wt. percent of a mixture of a polyethylene having a molecular weight of 1,500 to 3,500 and a second polyethylene having a molecular weight of 4,000 to 14,000, the weight ratio of the former to the latter ranging from 0.5 to 2.

3. The composition of claim 2 wherein two polyethylenes having molecular weights of about 2,000 and 12,000 respectively are incorporated into said composition.

4. The composition of claim 2 which additionally contains up to 18 wt. percent of microcrystalline wax.

5. An improved dairy wax composition comprising: (1) at least 80 wt. percent of a paraffin wax having a melting point of 120 to 127° F. (2) from about 1% to 2 wt. percent of a copolymer of isobutylene and styrene containing 30 to 70 wt. percent styrene, and (3) from about 1% to less than 5 wt. percent of a mixture of a polyethylene having a molecular weight of 1,500 to 3,500 and a second polyethylene having a molecular weight of 4,000 to 14,000, the weight ratio of the former to the latter ranging from 0.5 to 2.

6. The composition of claim 5 wherein said polyethylene mixture comprises polyethylenes having molecular weights of about 2,000 and 12,000 respectively.

References Cited in the file of this patent

UNITED STATES PATENTS

| | | |
|---|---|---|
| 2,577,816 | Schneider et al. | Dec. 11, 1951 |
| 2,593,381 | Young | Apr. 15, 1952 |
| 2,595,911 | Young et al. | May 6, 1952 |
| 2,655,492 | Young et al. | Oct. 13, 1953 |
| 2,842,508 | Sterk | July 8, 1958 |